US012800726B2

(12) United States Patent
Zhang et al.

(10) Patent No.: US 12,800,726 B2
(45) Date of Patent: Nov. 17, 2026

(54) MULTI-POINT SCANNING LIDAR AND DETECTION METHOD THEREOF

(71) Applicant: NINGBO SUNNY AUTOMOTIVE OPTECH CO., LTD., Yuyao City (CN)

(72) Inventors: Junming Zhang, Yuyao City (CN); Chao Xu, Yuyao City (CN); Jia Yang, Yuyao City (CN); Yanting Cao, Yuyao City (CN)

(73) Assignee: NINGBO SUNNY AUTOMOTIVE OPOTECH CO., LTD., Yuyao City (CN)

( * ) Notice: Subject to any disclaimer, the term of this patent is extended or adjusted under 35 U.S.C. 154(b) by 1249 days.

(21) Appl. No.: 17/432,635

(22) PCT Filed: Apr. 17, 2020

(86) PCT No.: PCT/CN2020/085260
§ 371 (c)(1),
(2) Date: Aug. 20, 2021

(87) PCT Pub. No.: WO2020/169118
PCT Pub. Date: Aug. 27, 2020

(65) Prior Publication Data

US 2022/0146638 A1 May 12, 2022

(30) Foreign Application Priority Data

Feb. 22, 2019 (CN) ......................... 201910132197.7

(51) Int. Cl.
*G01S 7/481* (2006.01)
*G01S 17/08* (2006.01)
*G01S 17/58* (2006.01)

(52) U.S. Cl.
CPC .......... *G01S 7/4817* (2013.01); *G01S 7/4815* (2013.01); *G01S 17/08* (2013.01); *G01S 17/58* (2013.01)

(58) Field of Classification Search
CPC ...... G01S 7/481; G01S 7/4811; G01S 7/4812; G01S 7/4815; G01S 7/4817; G01S 7/499;
(Continued)

(56) References Cited

U.S. PATENT DOCUMENTS

2018/0113200 A1 4/2018 Steinberg et al.
2018/0275275 A1 9/2018 Lundquist
(Continued)

FOREIGN PATENT DOCUMENTS

CN 1847881 A 10/2006
CN 101477198 A 7/2009
(Continued)

OTHER PUBLICATIONS

Oxford English Dictionary, "prism", 2025, Oxford University Press (Year: 2025).*
(Continued)

*Primary Examiner* — Yuqing Xiao
(74) *Attorney, Agent, or Firm* — Birch, Stewart, Kolasch & Birch, LLP

(57) ABSTRACT

A multi-point scanning lidar is disclosed, including at least one laser emitting end for emitting laser light, a scanning device, at least one light path transmission mechanism and a laser receiving end. The scanning device forms at least one light guide surface for transmitting the laser light to at least one target object. The light path transmission mechanism is arranged between the laser emitting end and the scanning device. The scanning device is arranged on a laser light path in such a manner that the light guide surface successively transmits the laser light to different parts of the target object.
(Continued)

The laser light path is a path on which the laser light is transmitted to the target object via the light path transmission mechanism, wherein the laser receiving end receives and analyzes the laser light reflected by the target object.

17 Claims, 11 Drawing Sheets

(58) Field of Classification Search
CPC .......... G01S 17/06; G01S 17/08; G01S 17/42; G01S 17/58; G02B 5/04; G02B 5/09
See application file for complete search history.

(56) References Cited

U.S. PATENT DOCUMENTS

| | | | | |
|---|---|---|---|---|
| 2018/0284286 | A1* | 10/2018 | Eichenholz | G01S 17/89 |
| 2019/0094345 | A1* | 3/2019 | Singer | G01S 7/484 |
| 2019/0101627 | A1* | 4/2019 | Hansson | G01S 17/931 |
| 2019/0101645 | A1* | 4/2019 | DeMersseman | B60Q 1/52 |
| 2019/0120943 | A1* | 4/2019 | Iguchi | G01S 17/08 |

FOREIGN PATENT DOCUMENTS

| | | | |
|---|---|---|---|
| CN | 102338875 | A | 2/2012 |
| CN | 108061904 | A | 5/2018 |
| CN | 207318710 | U | 5/2018 |
| CN | 108132472 | A | 6/2018 |
| CN | 108226903 | A | 6/2018 |
| CN | 108387904 | A | 8/2018 |
| CN | 108490419 | A | 9/2018 |
| CN | 108717195 | A | 10/2018 |
| CN | 108845410 | A | 11/2018 |
| CN | 109254286 | A | 1/2019 |
| CN | 109343029 | A | 2/2019 |
| JP | 2012-145749 | A | 8/2012 |

OTHER PUBLICATIONS

Chun et al., "Lasers and Their Applications in the Printing Industry," China Printing Industry Press, First Edition, No. 2, May 1995, pp. 306-307 (7 pages total), with English translation.

* cited by examiner

MULTI-POINT SCANNING LIDAR AND DETECTION METHOD THEREOF

CROSS REFERENCE TO RELATED APPLICATIONS

This application is the National Phase of PCT/CN2020/085260 filed on Apr. 17, 2020, which claims priority under 35 U.S.C. § 119(a) to Patent Application No. 201910132197.7 filed in China on Feb. 22, 2019, all of which are hereby expressly incorporated by reference into the present application.

TECHNICAL FIELD

The present disclosure relates to a lidar, and in particular to a multi-point scanning lidar and a detection method thereof.

TECHNICAL BACKGROUND

A lidar is a radar system that emits a laser beam to detect a target's location, speed and other characteristic quantities. The lidar system obtains the target's information such as distance and azimuth by receiving a laser signal emitted by the target. Current lidar systems include mechanical radar systems, hybrid solid-state lidars such as MEMS lidars, and solid-state radar systems such as 3D Flash solid-state radar systems.

The existing mechanical radar systems need to drive the entire mechanical radar to rotate through the motor so as to realize the detection of the target object. However, the mechanical radar has a complex structure and heavy overall mass. Therefore, when the driving motor drives the mechanical radar to rotate, the problems such as slow speed and unstable speed will occur, which will further cause poor reliability and reduced resolution of the entire mechanical radar.

The solid-state radar systems, such as the 3D Flash solid-state radar systems, detect the target object by means of surface beam detection. Using a surface beam to detect the target object will not only cause larger power loss of the light source, but also result in lower resolution at a position farther away from the laser emitting end. Therefore, the detection range of the solid-state lidar system is limited, which is only suitable for short-range detection. On the other hand, when the surface beam is used to detect the target object, the laser emitting end needs to emit stronger laser light, which will cause larger power loss at the laser emitting end.

As for the existing MEMS scanning lidar systems, they are substantially single-point scanning, and the use of single-point scanning will limit the vertical resolution and horizontal resolution of the MEMS scanning lidar systems. The reason for using single-point scanning is that if the MEMS scanning lidar is implemented as a multi-point scanning, the number of laser emitters needs to be increased. Moreover, in order to guide the laser light emitted by multiple laser emitters to the target object, it is inevitable to use a larger size of MEMS. If the size of the MEMS increases, it will in turn cause the problems such as slow rotational speed and unstable rotational speed of the MEMS, which will further result in poor reliability and reduced resolution of the entire mechanical radar.

Therefore, line scanning lidars are also used to detect the target object in the prior art. Such a manner of multi-line scanning requires the laser emitting end to emit linear laser light to realize the detection of the target object, which will make the laser emitting end need to work at higher power, thereby affecting the service life of the laser emitting end.

On the other hand, if multi-point scanning is used, it is necessary to configure an optical lens for each laser emitting end and laser receiving end, which will also cause the volume of the entire lidar to be increased.

SUMMARY

One of the main advantages of the present disclosure is to provide a multi-point scanning lidar and a detection method thereof, wherein without increasing the number of laser emitters, the multi-point scanning lidar realizes the detection of the target object by means of scanning at least one target object with multi-point laser scanning.

Another advantage of the present disclosure is to provide a multi-point scanning lidar and a detection method thereof, wherein the multi-point scanning lidar can reduce the volume of the multi-point scanning lidar while ensuring the resolution.

Another advantage of the present disclosure is to provide a multi-point scanning lidar and a detection method thereof, wherein the multi-point scanning lidar comprises at least one laser emitting end, at least one light path transmission mechanism, at least one laser receiving end, and at least one scanning device, and wherein the light path transmission mechanism can simultaneously transmit the emitted laser light to the target object and transmit the laser light reflected by the target object to the laser receiving end, so as to simplify the structure of the multi-point scanning lidar, thereby reducing the volume of the multi-point scanning lidar.

Other advantages and features of the present disclosure are fully embodied by the following detailed description and can be realized by the combination of means and apparatuses specifically pointed out in the appended claims.

According to one aspect of the present disclosure, a multi-point scanning lidar of the present disclosure is provided, which can achieve the foregoing objectives and other objectives and advantages, wherein the multi-point scanning lidar comprises:

at least one laser emitting end for emitting laser light;

a scanning device, wherein the scanning device forms at least one light guide surface for transmitting laser light to at least one target object;

at least one light path transmission mechanism, wherein the light path transmission mechanism is arranged between the laser emitting end and the scanning device, wherein the scanning device is arranged on a laser light path on which the laser light is transmitted to the target object via the light path transmission mechanism, in such a manner that the scanning device successively transmits the laser light transmitted by the light path transmission mechanism to different parts of the target object via the light guide surface; and a laser receiving end, wherein the laser receiving end receives and analyzes the laser light reflected by the target object.

According to an embodiment of the present disclosure, the light path transmission mechanism comprises a light splitting device, a laser shaping device, and a light guide device; wherein the light splitting device forms a first end of the light path transmission mechanism; wherein the light guide device forms a second end of the light path transmission mechanism; wherein the light splitting device is arranged on a propagation path of the laser light emitted from the laser emitting end to transmit the laser light incident from the first end to the laser shaping device and transmit the laser light incident from the second end to the laser receiving end; wherein the laser shaping device is arranged between the laser emitting end and the scanning device to trim the laser light transmitted by the light splitting device into point laser light; wherein the light guide device is arranged between the shaping device and the scanning device to transmit the laser light incident from the first end to the scanning device and transmit the laser light, which is transmitted from the scanning device to the second end, to the first end.

According to an embodiment of the present disclosure, the scanning device is implemented as a rotatable polygon mirror; wherein the mirror rotates around a connecting line between centers of upper and lower base surfaces of the mirror as an axis; and wherein an included angle between the connecting line between the centers of the upper and lower base surfaces of the mirror and the laser light radiated from the first end to the second end is 0-180°.

According to an embodiment of the present disclosure, the scanning device is implemented as a hexagonal mirror.

According to an embodiment of the present disclosure, included angles between at least one side surface of the hexagonal mirror and upper or lower base surfaces of the hexagonal mirror are acute angles.

According to an embodiment of the present disclosure, the multi-point scanning lidar comprises at least two laser emitting ends, at least two light path transmission mechanisms, and at least two laser receiving ends, and wherein two laser emitting ends, two light path transmission mechanisms and the at least two laser receiving ends are symmetrically arranged with respect to the scanning device.

According to an embodiment of the present disclosure, the scanning device is implemented as a MEMS.

According to an embodiment of the present disclosure, the scanning device is implemented as a symmetrical two-dimensional MEMS.

According to an embodiment of the present disclosure, the laser shaping device is implemented as a lens.

According to an embodiment of the present disclosure, the light guide device comprises an optical lens and at least one wave plate.

According to another aspect of the present disclosure, the present disclosure further provides a detection method of a multi-point scanning lidar, wherein the detection method of the multi-point scanning lidar comprises steps of:

- S001: transmitting detection laser light radiated via at least one laser emitting end to at least one light guide surface of a scanning device;
- S002: transmitting the laser light to different parts of at least one target object in such a manner that an angle between the light guide surface of the scanning device and the laser light emitted from the laser emitting end is variable; and
- S003: the laser receiving end of the multi-point scanning lidar receiving and analyzing the laser light diffusely reflected by the target object.

According to an embodiment of the present disclosure, before the step S001, the detection method of the multi-point scanning lidar further comprises a step of:

- S004: trimming the detection laser light radiated by the laser emitting end to be point laser light.

According to an embodiment of the present disclosure, before the step S001, the detection method of the multi-point scanning lidar further comprises step S005: transmitting the laser light emitted by the laser emitting end to the light guide surface of the scanning device through the first end of the light path transmission mechanism to the second end of the light path transmission mechanism, and wherein before the step S003, the detection method of the multi-point scanning lidar further comprises step S006: the light path transmission mechanism transmitting the laser light diffusely reflected by the target object from the second end to the first end.

Further objectives and advantages of the present disclosure will be fully embodied through the understanding of the following description and the drawings.

These and other objectives, features and advantages of the present disclosure are fully embodied by the following detailed description, drawings and claims.

DETAILED DESCRIPTION OF THE EMBODIMENTS

Figure 1:
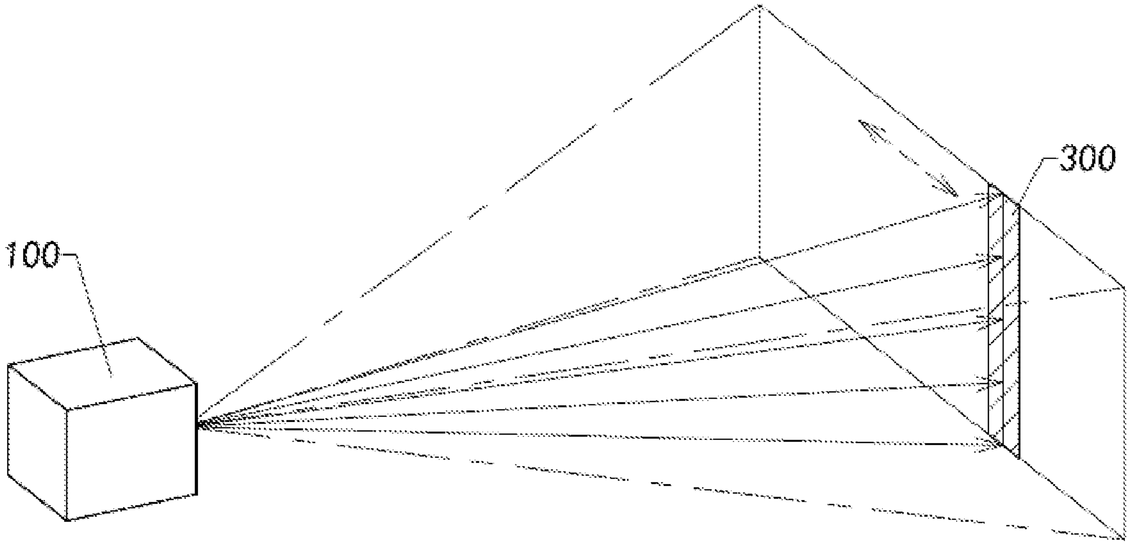
FIG. 1 shows a schematic diagram of a multi-point scanning lidar detecting a target object according to a preferred embodiment of the present disclosure.
Figure 2:
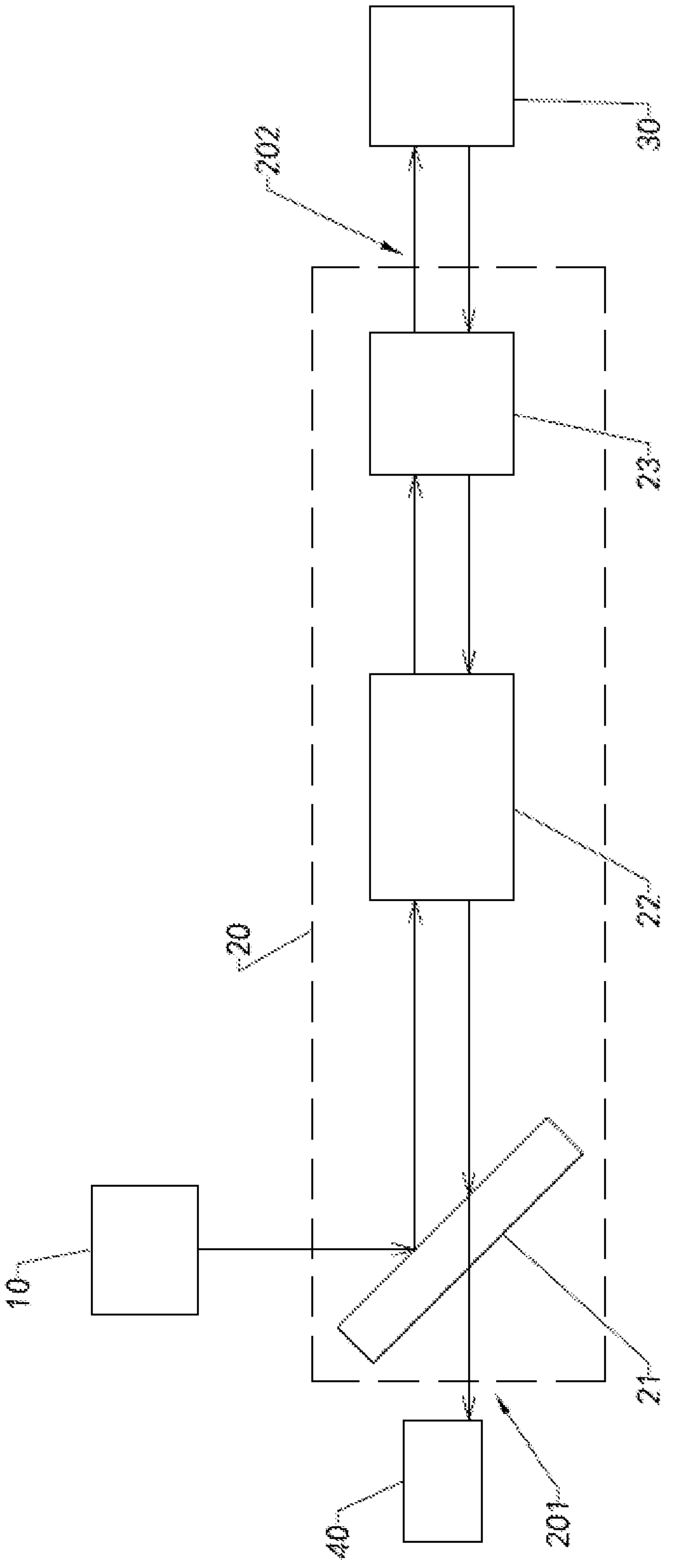
FIG. 2 shows a schematic diagram of an overall structure of the multi-point scanning lidar according to the preferred embodiment of the present disclosure.
Figure 3:
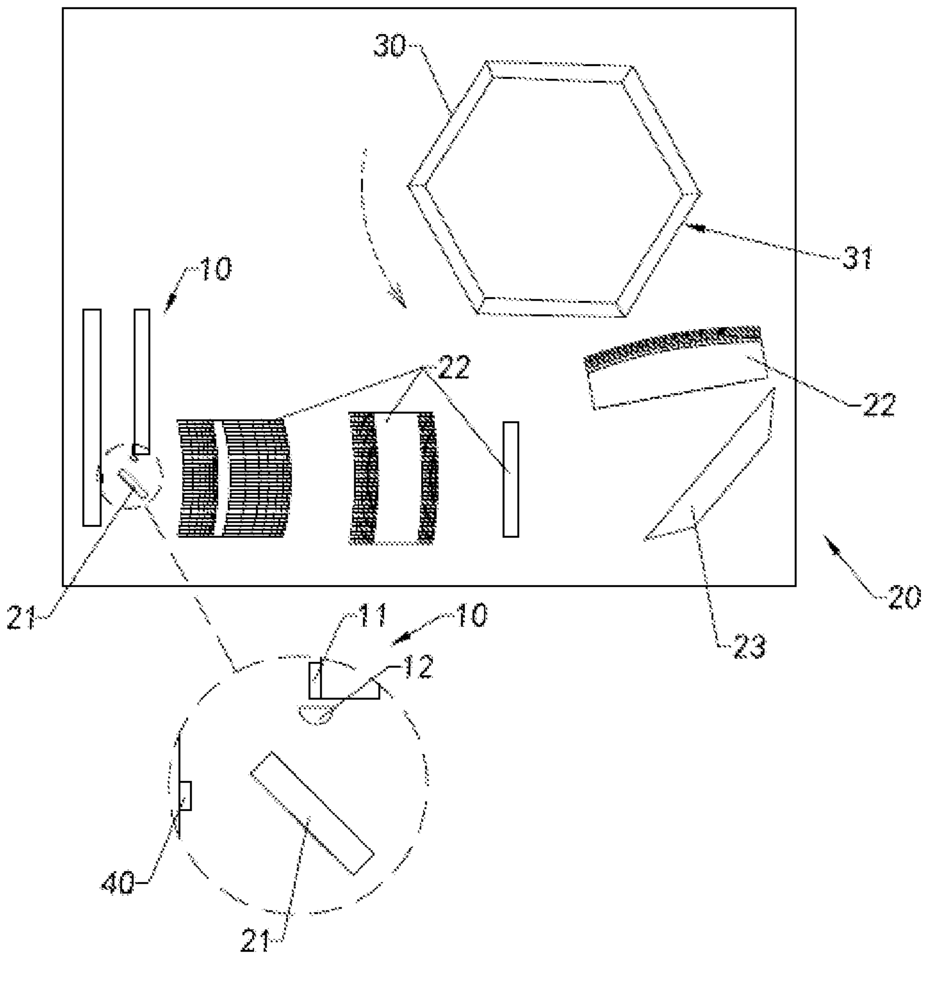
FIG. 3 shows a schematic structural diagram of the multi-point scanning lidar according to a preferred embodiment of the present disclosure at a certain angle.
Figure 4A:
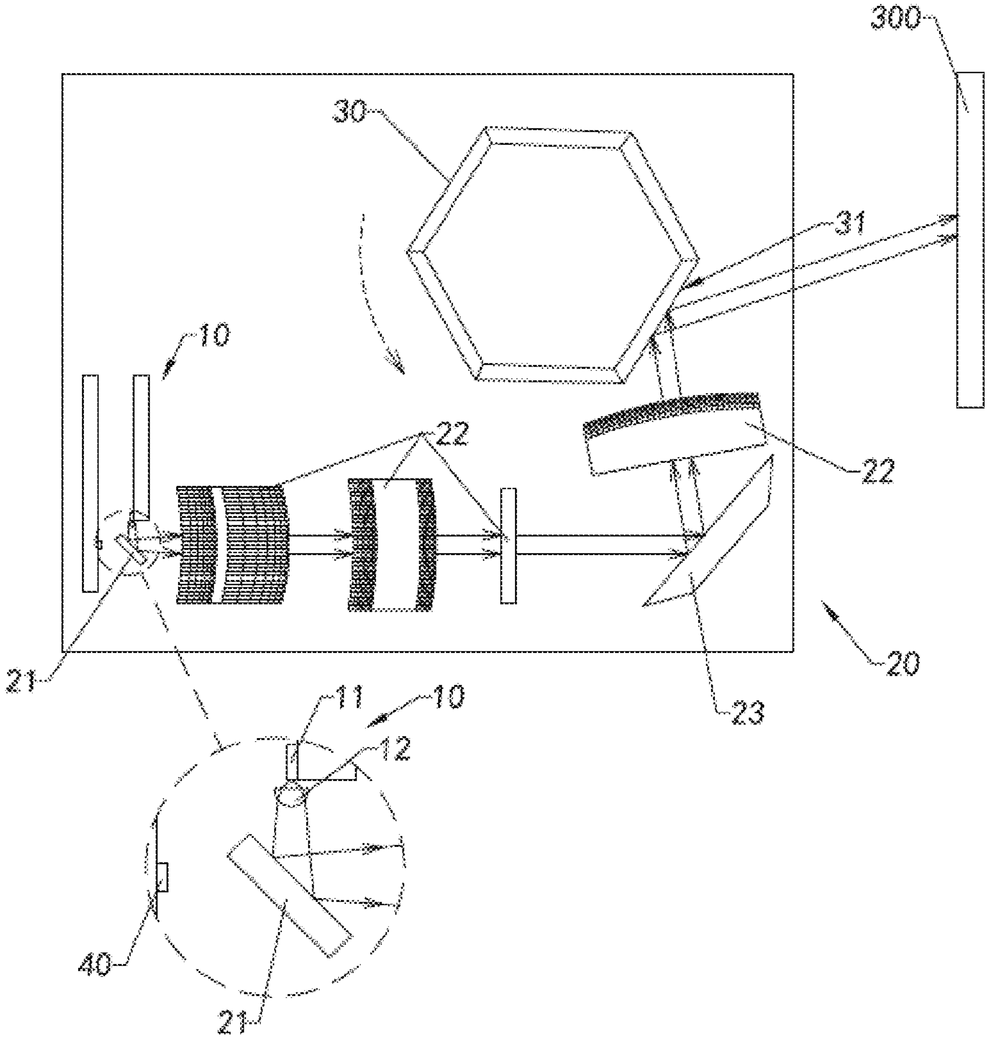
FIG. 4A shows a schematic diagram of the multi-point scanning lidar detecting a target object by emitting laser light according to the preferred embodiment of the present disclosure.
Figure 4B:
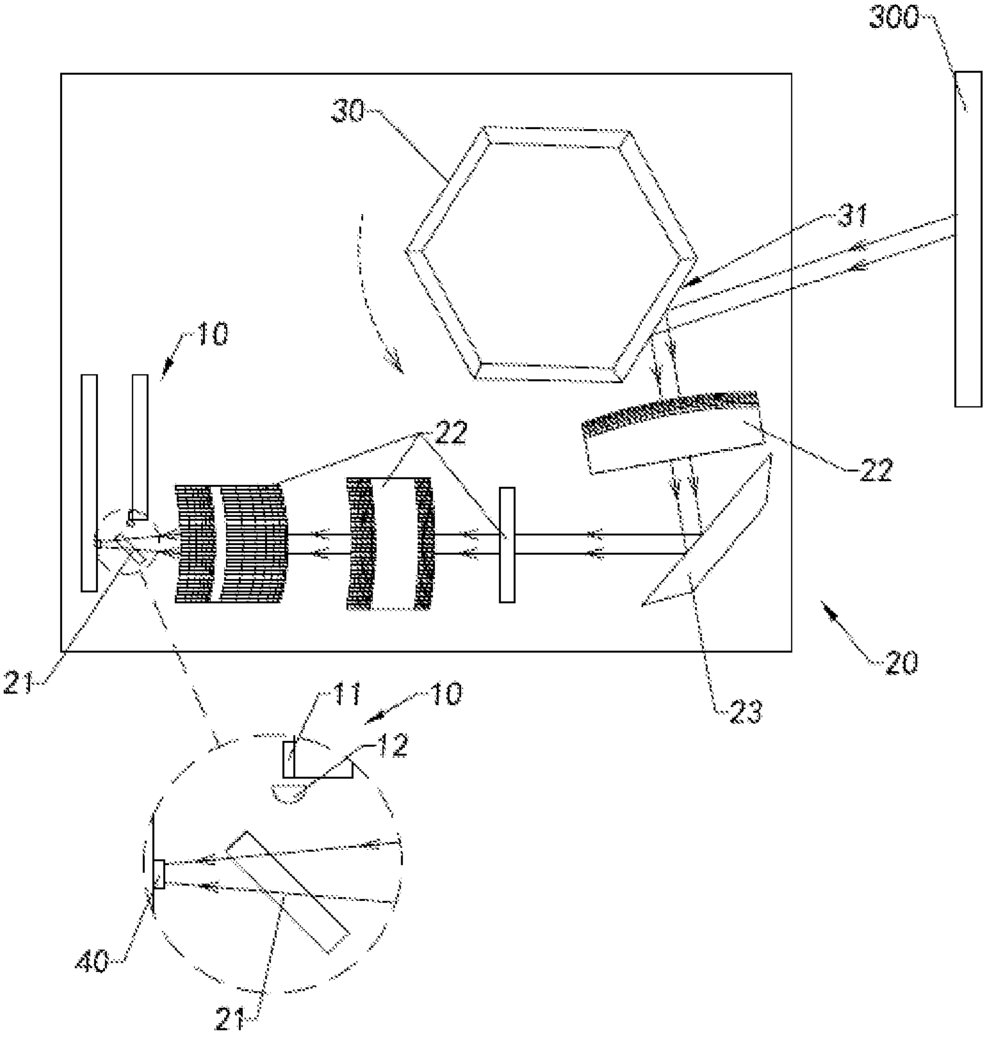
FIG. 4B shows a schematic diagram of the multi-point scanning lidar detecting a target object by receiving laser light reflected by the target object according to the preferred embodiment of the present disclosure.
Figure 5A:
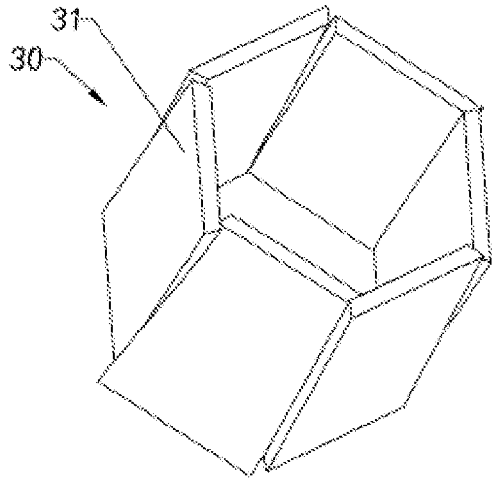
FIG. 5A shows a perspective view of a first embodiment of a scanning device of the multi-point scanning lidar according to the present disclosure.
Figure 5B:
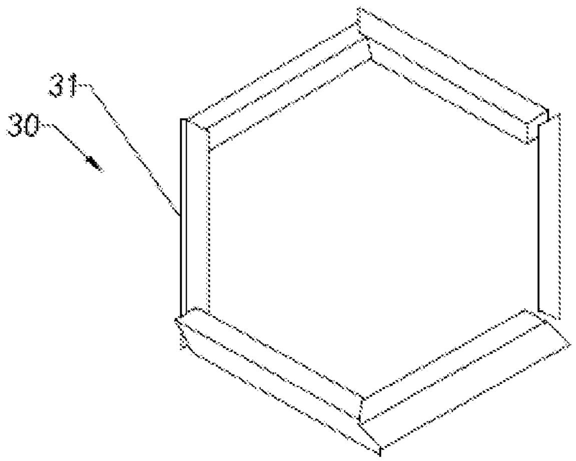
FIG. 5B shows a top view of an embodiment of the scanning device of the multi-point scanning lidar according to the present disclosure.
Figure 6:
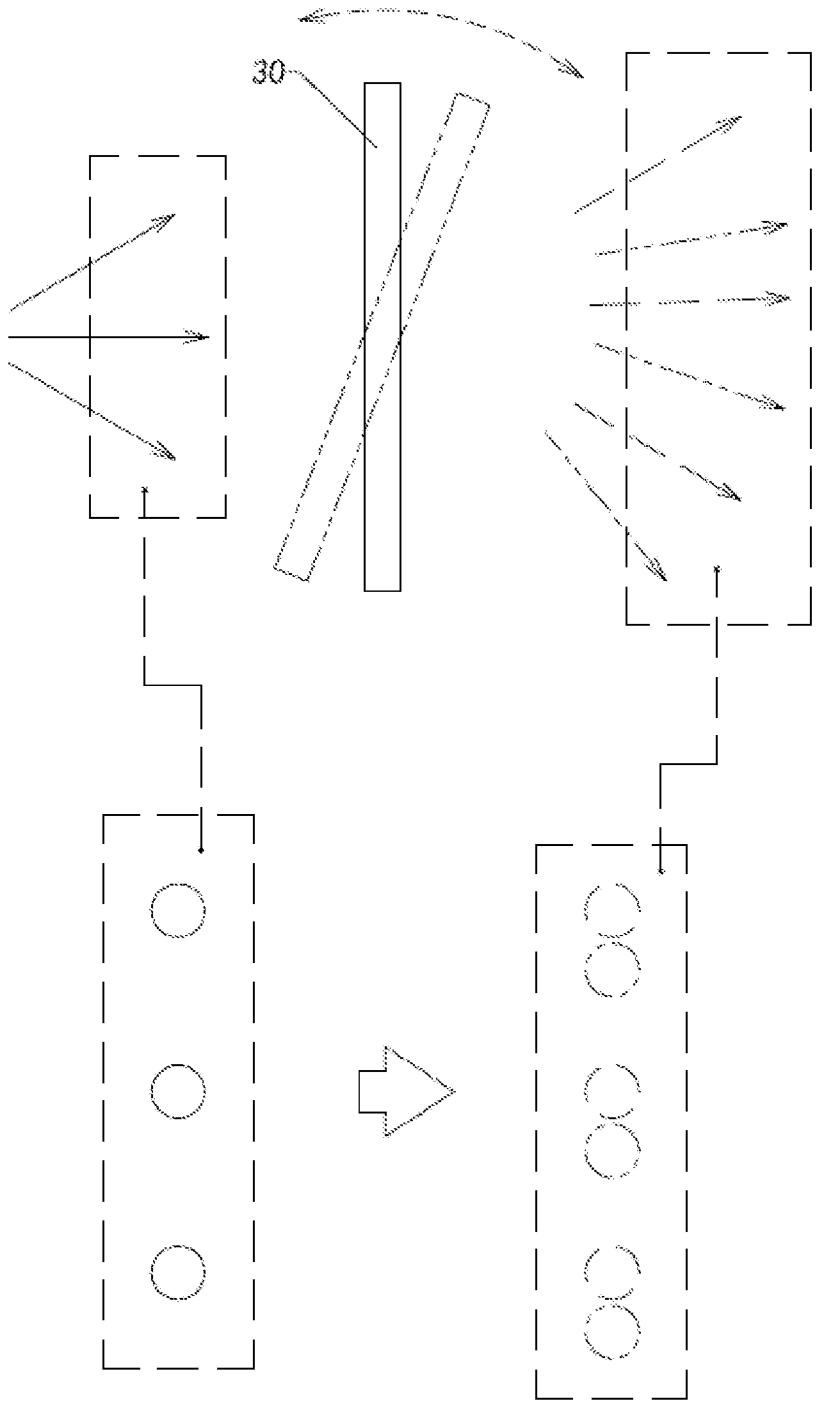
FIG. 6 shows a schematic diagram after laser light is directed to a target object by the scanning device of the multi-point scanning lidar according to the first embodiment of the present disclosure.

The following description is presented to disclose the present disclosure to enable those skilled in the art to practice the present disclosure. Preferred embodiments in the following description are by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present disclosure.

It should be understood by those skilled in the art that in the disclosure of the present disclosure, the orientation or positional relationship indicated by the terms "longitudinal", "transverse", "upper", "lower", "front", "back", "left", "right", "vertical", "horizontal", "top", "bottom", "inside", "outside", etc. is based on the orientation or positional relationship shown in the drawings, which is merely for the convenience of describing the present disclosure and simplifying the description, and does not indicate or imply that the mentioned apparatus or element must have a particular orientation and be constructed and operated in the particular orientation. Therefore, the above terms cannot be construed as limiting the present disclosure.

It may be understood that the term "a" or "an" should be understood to mean "at least one" or "one or more", that is, in one embodiment, the number of an element may be one, and in other embodiments, the number of the element may be multiple. The term "a" or "an" cannot be understood as a limitation on the number.

With reference to FIGS. 1 to 8B, a multi-point scanning lidar 100 according to a preferred embodiment of the present disclosure will be described in detail below, wherein the multi-point scanning lidar 100 can be used to detect at least one target object 300, to obtain physical information of the target object 300, such as a position and speed of the target object 300, as shown in FIG. 1.

With reference to FIGS. 2 to 6, specifically, the multi-point scanning lidar 100 includes at least one laser emitting end 10, a light path transmission mechanism 20, a scanning device 30 and a laser receiving end 40. The laser emitting end 10 emits at least one laser beam during operation. The light path transmission mechanism 20 can simultaneously shape laser light emitted by the laser emitting end 10 into point laser light and guide the shaped point laser light to the scanning device 30. In the present disclosure, the scanning device 30 forms at least one light guide surface 31, wherein the scanning device 30 is arranged on a path of the point laser light shaped by the light path transmission mechanism 20 to transmit the laser light through the light guide surface 31 of the scanning device 30 to the target object 300.

It is worth mentioning that the scanning device 30 is arranged on the path of the point laser light shaped by the light path transmission mechanism 20 in such a manner that an included angle between the point laser light shaped by the light path transmission mechanism 20 and the light guide surface 31 is variable. In this way, the point laser light transmitted by the light path transmission mechanism 20 will be guided by the scanning device 30 to the target object 300 to detect different parts of the target object 300.

Specifically, since the scanning device 30 is arranged on the path of the point laser light shaped by the light path transmission mechanism 20 in such a manner that the included angle between the point laser light shaped by the light path transmission mechanism 20 and the light guide surface 31 is variable, and the included angle between the light guide surface 31 of the scanning device 30 and the light path transmission mechanism 20 changes quickly, a beam of point laser light shaped by the light path transmission mechanism 20 is successively guided to different parts of the target object 300 in a short time, so as to realize multi-point detection of different parts of the target object 300, thereby improving the resolution of the multi-point scanning lidar 100.

It can be understood that with this structure arrangement, the multi-point scanning lidar 100 can also have higher resolution without increasing the number of the laser emitting ends 10. Specifically, even when the laser emitting end 10 is implemented as a single laser (the number of laser emitting end is the same as that in the single-point scanning MEMS in the prior art), since the multi-point scanning lidar 100 can successively guide single-point laser light to different parts of the target object 300, the multi-point scanning lidar 100 can have higher resolution.

More specifically, the laser emitting end 10 includes at least one laser emitter 11 and at least one emitting lens 12, wherein the emitting lens 12 is arranged on a propagation path of laser light emitted by the laser emitter 11 to shape the laser beam emitted by the laser emitter 11. It can be understood by those skilled in the art that in the present disclosure, the laser emitter 11 includes at least one circuit board and a laser light source electrically connected to the circuit board.

In addition, it can be understood by those skilled in the art that the laser receiving end 40 includes at least one circuit board and a laser detector electrically connected to the circuit board.

The light path transmission mechanism 20 includes a light splitting device 21, at least one laser shaping device 22, and at least one light guide device 23, wherein the light splitting device 21, the laser shaping device 22, and the light guide device 23 are simultaneously arranged on the path of the laser light emitted by the laser emitting end 10 and the path of the light received by the laser receiving end 40.

It is worth mentioning that the light path transmission mechanism 20 forms a first end 201 near the laser receiving end 40 and a second end 202 near the scanning device 30. After the laser light emitted by the laser emitting end 10 is trimmed and transmitted by the light path transmission mechanism 20, it is guided to the scanning device 30 from the second end 202.

Since the included angle between the light guide surface 31 of the scanning device 30 and the light path transmission mechanism 20 continuously changes, the scanning device 30 can quickly scan different parts of the target object 300. Subsequently, the target object 300 reflects the laser light to the second end 202 of the light path transmission mechanism 20 by means of diffuse reflection. The laser light diffusely reflected by the target object 300 is then received by the laser receiving end 40 after passing through the first end 201 of the light path transmission mechanism 20. After the laser receiving end 40 receives the laser light diffusely reflected by the target object 300 through the first end 201, the physical information of the target object 300 can be obtained by analyzing and processing it.

It can be understood that, in an embodiment of the present disclosure, the light splitting device 21 may be implemented as a light splitting optical lens. Specifically, the light splitting device 21 forms the first end 201 of the light path transmission mechanism 20, and the light splitting device 21 forms a light-transmitting region and a light guide region at the first end 201. The laser emitting end 10 is aligned with the light guide region of the first end 201 so that the laser light emitted by the laser emitting end 10 is guided to the laser shaping device 22 and the light guide device 23. The laser receiving end 40 is aligned with the light-transmitting region of the first end 201 so that the laser light diffusely reflected by the target object 300 is received by the laser receiving end 40 through the light-transmitting region. In another embodiment of the present disclosure, the light splitting device 21 is implemented to include a polarizer.

The laser shaping device 22 is arranged on a laser propagation path transmitted by the light guide region of the light splitting device 21 to shape the laser light transmitted by the light guide region of the light splitting device 21. Specifically, the laser shaping device 22 can shape the laser light transmitted by the light splitting device 21 into a point shape, so that the laser light shaped by the laser shaping device 22 is radiated to the target object 300 in the form of point laser light.

It is worth mentioning that in the present disclosure, the laser shaping device 22 is implemented as at least one lens, wherein the lens is arranged in a predetermined manner to form the laser shaping device 22. Specifically, in this embodiment, the laser shaping device 22 is implemented as at least two sets of lenses, wherein at least one set of lenses is arranged between the light splitting device 21 and the light guide device 23. At least one set of lenses is arranged between the light guide device 23 and the scanning device 30. With this arrangement, the laser light transmitted by the light splitting device 21 is shaped into a point shape.

Preferably, the laser shaping device 22 further includes at least one wave plate, wherein the wave plate is arranged between the light splitting device 21 and the scanning device 30 to rotate the vibration direction of the laser light radiated from the first end 201 of the light path transmission mechanism 20 to the second end 202 of the light path transmission mechanism 20, so that the laser light radiated from the first end 201 of the light path transmission mechanism 20 to the second end 202 of the light path transmission mechanism 20, and the laser light radiated from the second end 202 of the light path transmission mechanism 20 to the first end 201 of the light path transmission mechanism 20 have different vibration directions after passing through the wave plate. In this way, the laser light radiated from the first end 201 of the light path transmission mechanism 20 to the second end 202 of the light path transmission mechanism 20 and the laser light radiated from the second end 202 of the light path transmission mechanism 20 to the first end 201 of the light path transmission mechanism 20 are guided to the scanning device 30 and the laser receiving end 40, respectively, after passing through the light splitting device 21 implemented as a polarizer.

Preferably, the wave plate adopts a $\lambda/4$ wave plate to rotate the vibration direction of laser light.

It can be understood by those skilled in the art that, because the laser shaping device 22 can shape the laser light emitted by the laser emitting end 10 into a point shape, the multi-point scanning lidar 100 only requires the laser emitting end 10 with smaller power.

Further, the light guide device 23 is arranged between the polarizing device 21 and the scanning device 30 to transmit the laser light radiated from the first end 201 to the second end 202 to the light guide surface 31 of the scanning device 30, so that the laser light radiated from the second end 202 is radiated to the target object 300.

Furthermore, after the laser light is guided to the target object 300 via the light guide surface 31 of the light guide device 23, diffuse reflection will occur. The laser light reflected by the target object 300 is transmitted to the first end 201 of the light path transmission mechanism 20 via the second end 202 of the light path transmission mechanism 20, and then is transmitted to the laser receiving end 40. The laser receiving end 40 can determine the physical information of the target object 300 by comparing and analyzing the laser light received by the laser receiving end 40 that is diffusely reflected by the target object 300.

It is worth mentioning that, in the present disclosure, the laser light transmitted from the second end 202 to the first end 201 is guided to the laser receiving end 40 via the light-transmitting region of the polarizing device 21.

It can be understood that, in the present disclosure, since the laser light emitted by the laser emitting end 10 and the laser light received by the laser receiving end 40 both pass through the light path transmission mechanism 20, the overall volume of the multi-point scanning lidar 100 can be reduced.

In an embodiment of the present disclosure, the scanning device 30 is implemented as a polygonal mirror. Specifically, in this embodiment, the scanning device 30 is implemented as a hexagonal mirror. In other words, the scanning device 30 forms at least six light guide surfaces 31. In other cases, the scanning device 30 may be implemented in the form of a triangular mirror, a cube, a pentagonal mirror, and the like. The light guide device 23 can guide the laser light to the light guide surface 31 of the scanning device 30. In this embodiment, since the included angle between the light guide surface 31 of the scanning device 30 and the laser light transmitted through the light guide device 23 can continuously change, after the laser light transmitted through the light guide device 23 is further transmitted through the scanning device 30, the single-point laser light transmitted by the light guide device 23 can be successively guided to the target object 300, so that the target object 300 can be detected by means of multi-point scanning.

In another feasible embodiment, the scanning device 30 may be implemented in the form of a mirror driven by a motor, and scanning is realized by rotating the angle of the mirror.

It is worth mentioning that, in the present disclosure, the light guide surface 31 of the scanning device 30 is designed to intersect the propagation path of the laser light transmitted through the light guide device 23, wherein when the scanning device 30 is implemented as a mirror, the included angle between a connecting line between centers of upper and lower base surfaces of the mirror and the laser light radiated from the first end to the second end is 0-180°. In addition, the hexagonal mirror can rotate around the connecting line between the centers of the upper and lower base surfaces of the hexagonal mirror as an axis.

Preferably, in the present disclosure, at least one light guide surface 31 formed by the hexagonal mirror is not perpendicular to the upper and lower base surfaces of the hexagonal mirror. In other words, the included angles between the light guide surface 31 formed by the hexagonal mirror and the upper or lower base surfaces of the hexagonal mirror are acute angles. In this way, after the laser light emitted by the single laser emitting end 10 passes through the light guide surface 31 formed by the rotating hexagonal mirror, multiple laser points are formed in the vertical direction, thereby increasing the density of the laser points in the vertical direction to realize the multi-point scanning of the target object 300 with reference to FIG. 6.

It can be understood by those skilled in the art that, with such a design, the multi-point scanning lidar 100 can have higher resolution in the vertical direction. It can be understood by those skilled in the art that, when the number of the laser emitting ends 10 of the multi-point scanning lidar 100 is implemented as one, the multi-point scanning lidar 100 can still have higher resolution in the vertical direction.

Preferably, the included angles between each light guide surface 31 of the hexagonal mirror and the upper or lower base surfaces of the hexagonal mirror are implemented as the same acute angle. In this way, the point laser light guided to the target object 300 via the scanning device 30 is uniformly directed to different parts of the target object 300 in the vertical direction with reference to FIGS. 5A and 5B.

More preferably, the included angles between each light guide surface 31 of the hexagonal mirror and the upper or lower base surfaces of the hexagonal mirror are implemented as different angles. In other words, the hexagonal mirror is not a regular hexagonal mirror, so that the scanning position becomes more abundant, thereby improving the scanning resolution.

It is worth mentioning that in this embodiment, the multi-point scanning lidar 100 is symmetrically provided with at least two laser emitting ends 10, two light path transmission mechanisms 20, and two laser receiving ends 40, wherein the two laser emitting ends 10, the two light path transmission mechanisms 20, and the two laser receiving ends 40 share one scanning device 30, so that when the multi-point scanning lidar 100 meets the resolution requirements of multiple scanning lidars in terms of resolution, it also has a smaller volume.

The laser receiving end 40 includes a laser receiver and at least one laser receiving lens, wherein the laser receiving lens is arranged on the propagation path of laser light radiated from the second end 202 of the light path transmission mechanism 20 to the first end 201 of the light path transmission mechanism 20, to transmit the laser light radiated from the second end 202 of the light path transmission mechanism 20 to the first end 201 of the light path transmission mechanism 20 to the laser receiver.

It is worth mentioning that by means of the light path transmission mechanism 20, the laser receiving lens of the laser receiving end 40 and the emitting lens 12 of the laser emitting end 10 can be implemented as an integrated arrangement, that is, the laser emitter 11 and the laser receiver share a lens, thereby reducing the overall volume of the multi-point scanning lidar 100.

Figure 7A:
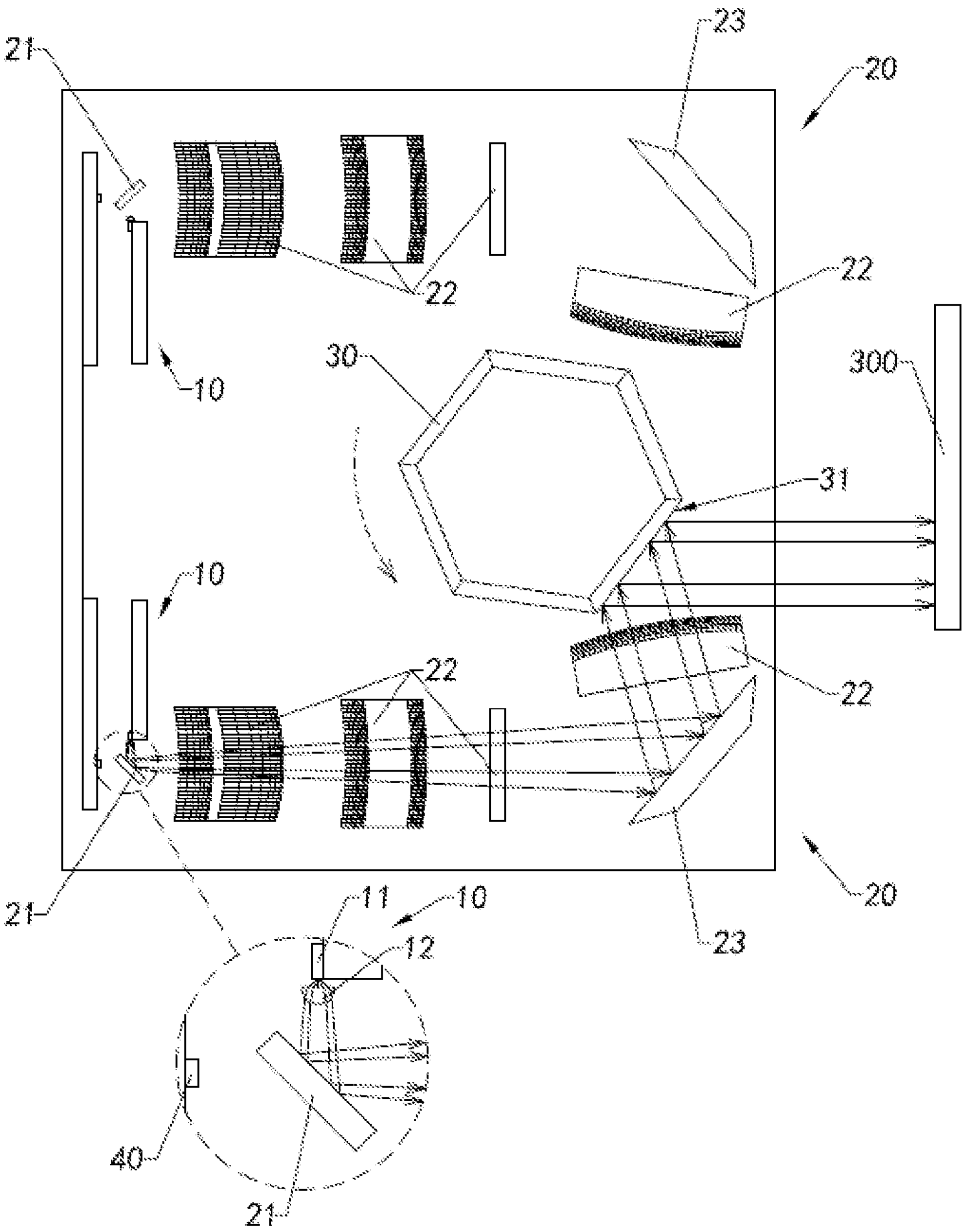
FIG. 7A shows a schematic diagram of a modified embodiment of the multi-point scanning lidar detecting a target object by emitting laser light according to the present disclosure.
Figure 7B:
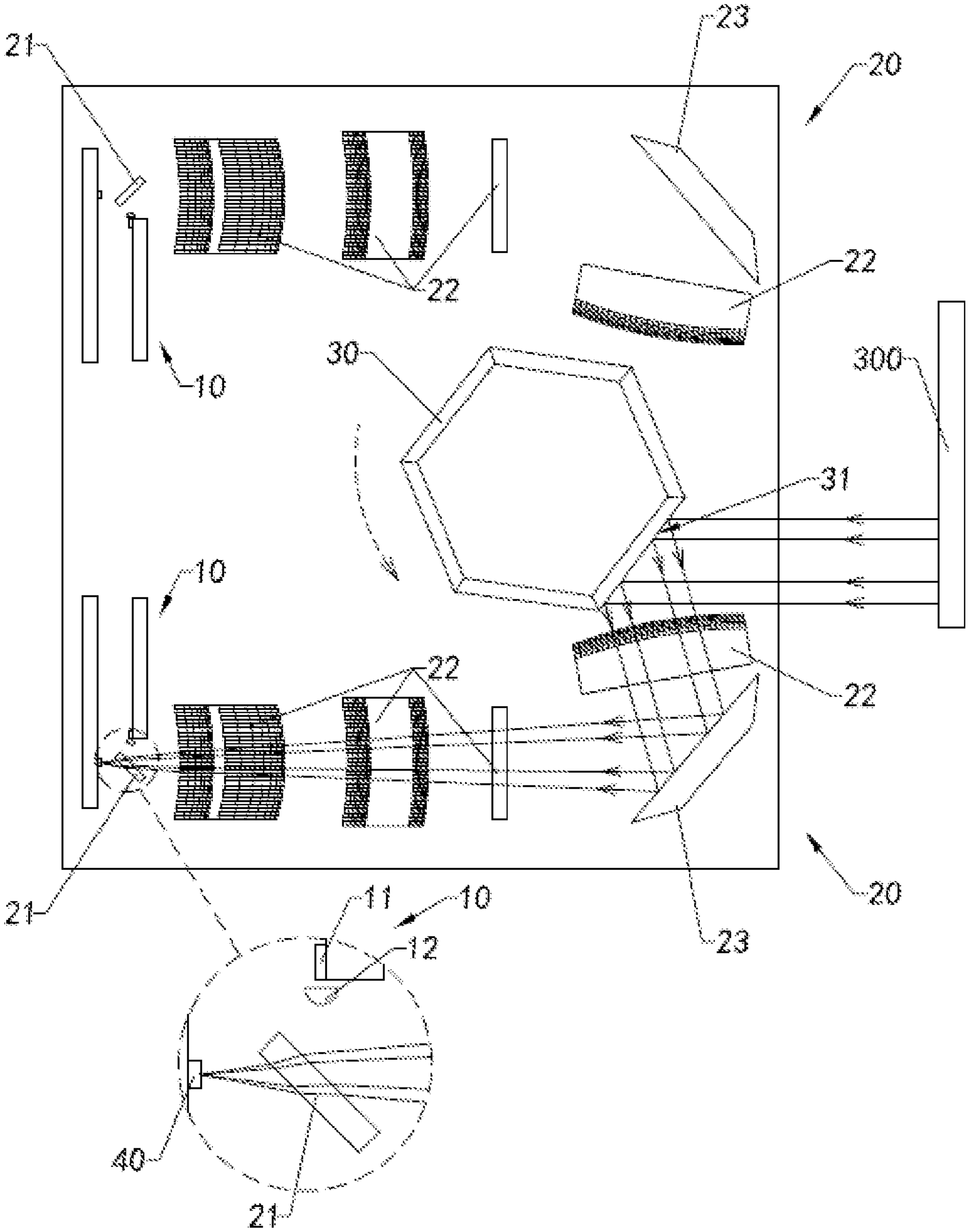
FIG. 7B shows a schematic diagram of the modified embodiment of the multi-point scanning lidar detecting a target object by receiving laser light reflected by the target object according to the present disclosure.

Referring to FIGS. 7A and 7B, which show schematic diagrams in two states of the multi-point scanning lidar 100 when detecting the target object 300, respectively.

With reference to FIG. 7A, the laser light radiated from the two laser emitting ends 10 of the multi-point scanning lidar 100 separately passes through one of the light path transmission mechanisms 20, and then is separately transmitted from the first end 201 of the light path transmission mechanism 20 to the second end 202 of the light path transmission mechanism 20. After the laser light radiated from the first end 201 passes through the second end 202, it is guided to the target object 300 via the scanning device 30.

Since the included angle between the light guide surface 31 of the scanning device 30 and the laser light guided to the scanning device 30 via the light path transmission mechanism 20 gradually changes with the rotation of the scanning device 30, the laser point shaped by the laser shaping device 22 of the light path transmission mechanism 20 forms a plurality of scanning points in the vertical direction after passing through the light guide surface 31 of the scanning device 30, to scan different parts of the target object 300.

It is worth mentioning that because the rotational speed of the scanning device 30 is higher, the rate of change of the included angle between the light guide surface 31 of the scanning device 30 and the laser light guided to the scanning device 30 through the light path transmission mechanism 20 is larger. Accordingly, the laser points shaped by the laser shaping device 22 of the light path transmission mechanism 20 are densely guided to the target object 300 after passing through the light guide surface 31 of the scanning device 30, so that the multi-point scanning lidar 100 can improve the resolution by means of multi-point scanning in the vertical direction.

It is worth mentioning that although the multi-point scanning lidar 100 includes two laser emitting ends 10, two laser receiving ends 40, and two light path transmission mechanisms 20. However, since the multi-point scanning lidar 100 shares one scanning device 30, the multi-point scanning lidar 100 can also rotate at a vibration frequency of the single-point scanning lidar, but can have higher resolution than single-point scanning without increasing the overall size of the scanning device 30.

Figure 8A:
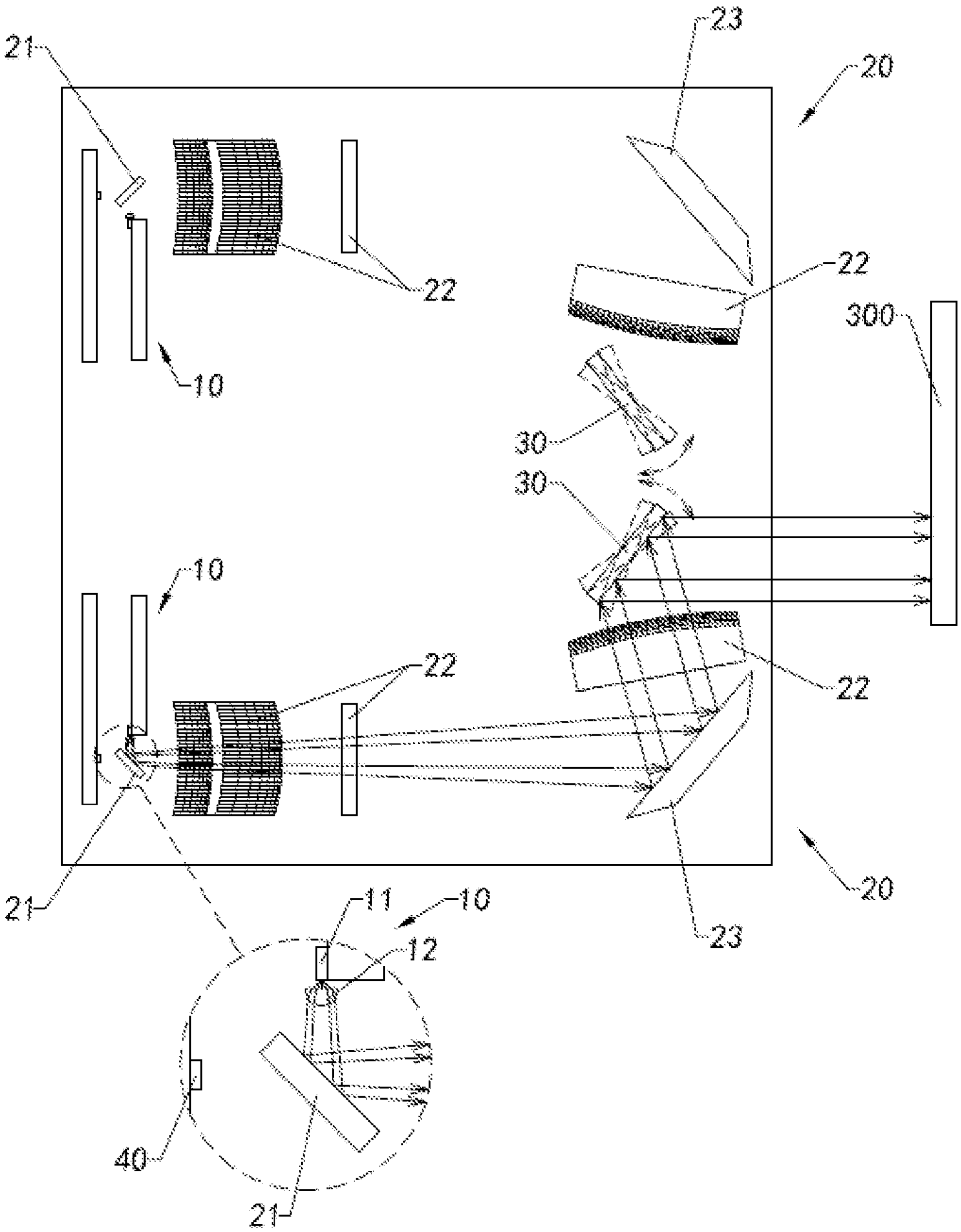
FIG. 8A shows a schematic diagram of a second embodiment of the multi-point scanning lidar detecting a target object by emitting laser light according to the present disclosure.
Figure 8B:
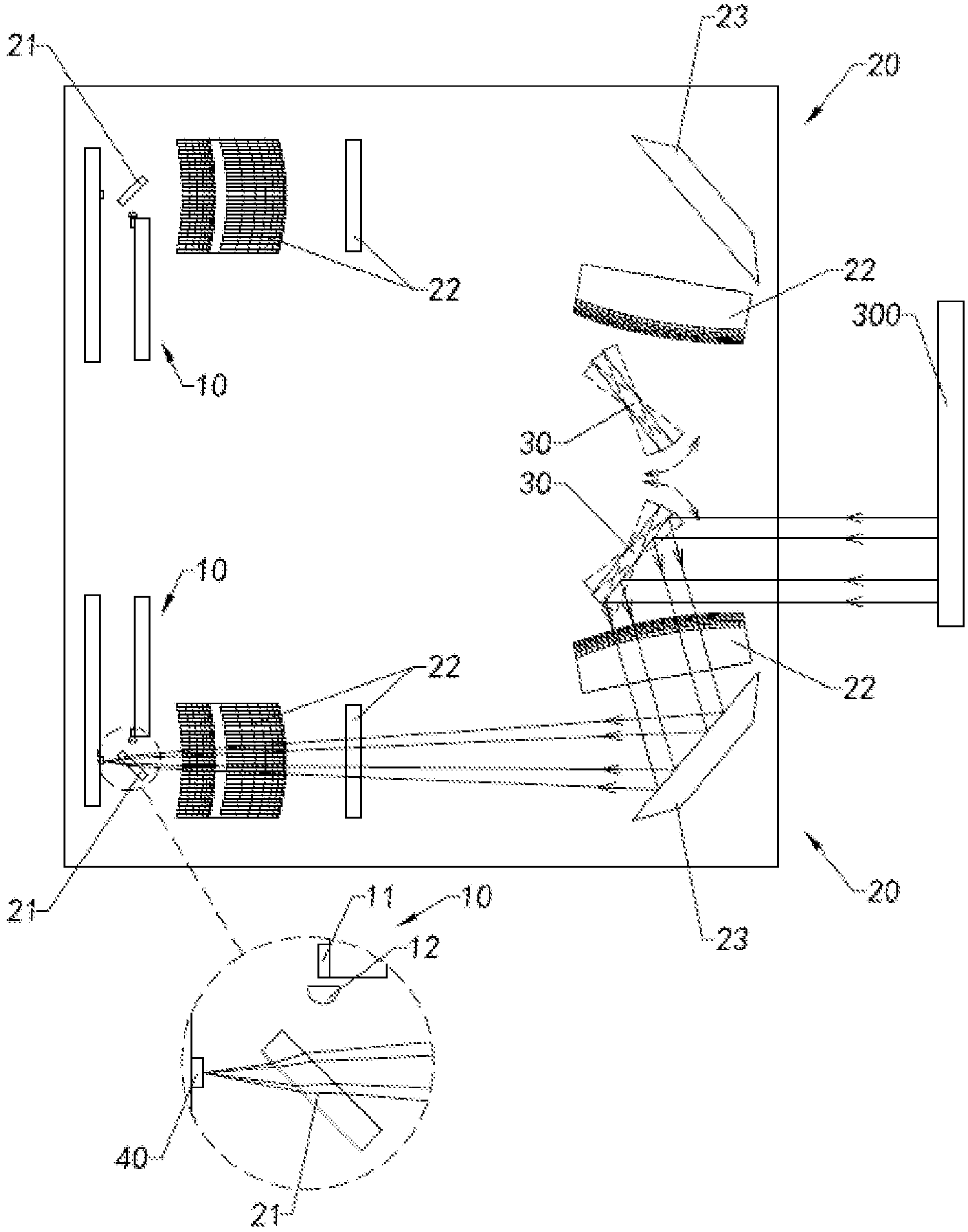
FIG. 8B shows a schematic diagram of the second embodiment of the multi-point scanning lidar detecting a target object by receiving laser light reflected by the target object according to the present disclosure.

With reference to FIGS. 8A and 8B, in another embodiment of the present disclosure, the scanning device 30 is implemented as a two-dimensional MEMS. After the laser light generated from the laser emitting end 10 is guided to the scanning device 30 through the light path transmission mechanism 20, the laser light will be guided to the target object 300 by the scanning device 30.

That is to say, the scanning device 30 is two separate devices in this embodiment, which perform the scanning operation separately, simplifying the operation setting. Of course, for the foregoing embodiment in which the scanning device 30 is shared, the operation form of one, two or more devices may also be adopted.

It is worth mentioning that in this embodiment, the scanning device 30 implemented as the two-dimensional MEMS can generate vibrations, so that the included angle between the laser light guided to the scanning device 30 through the light path transmission mechanism 20 and the light guide surface 31 will continuously change. Since the scanning device 30 implemented as the two-dimensional MEMS vibrates at a higher frequency, a single laser beam guided to the scanning device 30 through the light path transmission mechanism 20 will be guided to different parts of the target object 300 after passing through the light guide surface 31 of the scanning device 30, so that the multi-point scanning lidar 100 can have higher resolution.

Preferably, in this embodiment, the scanning device 30 is implemented as a symmetrical two-dimensional MEMS, and the multi-point scanning lidar 100 includes at least two laser emitting ends 10, two light path transmission mechanisms 20 and two laser receiving ends 40. The scanning device 30 implemented as the two-dimensional MEMS can form at least two light guide surfaces 31, wherein when the scanning device 30 implemented as the two-dimensional MEMS vibrates, the laser light emitted by one of the laser emitting ends 10 in the multi-point scanning lidar 100 passes through one of the light path transmission mechanisms 20, and then is guided to a part of the target object 300 by one of the light guide surfaces 31 of the two-dimensional MEMS, and the laser light emitted by the other laser emitting end 10 in the point scanning lidar 100 passes through the other light path transmission mechanism 20, and then is guided to the other part of the target object 300 by the other light guide surface 31 of the two-dimensional MEMS.

It is also worth mentioning that in this embodiment, although the multi-point scanning lidar 100 includes at least two laser emitting ends 10 and two laser receiving ends 20, since the multi-point scanning lidar 100 can share one scanning device 30, the multi-point scanning lidar also has higher resolution while the overall volume of the scanning device 30 in the multi-point scanning lidar 100 remains unchanged.

With reference to FIG. 8B, the laser light guided onto the target object 300 will be further guided by the scanning device 30 to the second end 202 of the light path transmission mechanism 20 due to diffuse reflection. The laser light guided to the second end 202 of the light path transmission mechanism 20 passes through the first end 201 of the light path transmission mechanism 20 and then is guided to the laser receiving end 40 through the light splitting device 21.

According to another aspect of the present disclosure, the present disclosure provides a detection method of a multi-point scanning lidar, wherein the detection method of the multi-point scanning lidar includes steps of: S001: transmitting detection laser light radiated via at least one laser emitting end 10 to at least one light guide surface 31 of a scanning device 30; S002: transmitting the laser light to different parts of at least one target object 300 in such a manner that an angle between the light guide surface 31 of the scanning device 30 and the laser light emitted from the laser emitting end 10 is variable; and S003: a laser receiving end 40 of the multi-point scanning lidar 100 receiving and analyzing the laser light diffusely reflected by the target object 300 to obtain physical information of the target object 300, such as a position, moving speed and the like of the target object 300.

It is worth mentioning that, in the present disclosure, since the light guide surface 31 of the scanning device 30 successively transmits the laser light to different parts of the target object 300 in a such manner that the angle between the light guide surface 31 and the laser light emitted by the laser emitting end 10 is variable, a single laser point transmitted to the target object 300 can be successively guided to different parts of the target object 300, so that the single laser point can detect different parts of the target object in the vertical direction, thereby improving the resolution of the multi-point scanning lidar.

Preferably, in the present disclosure, the scanning device 30 in the step S002 is implemented as a polygonal mirror, such as a hexagonal mirror. Moreover, the included angles between at least one side surface of the polygonal mirror and the upper or lower base surfaces of the polygonal mirror are implemented as acute angles. With this arrangement, when the multi-point scanning lidar 100 detects the target object 300, the multi-point scanning lidar 100 performs multi-point scanning on the target object 300 by successively guiding a single laser beam to different parts of the target object 300.

It is worth mentioning that, in the present disclosure, before the step S002, the detection method of the multi-point scanning lidar further includes a step of: S004: trimming the detection laser light radiated by the laser emitting end 10 to point laser light.

It can be understood that, in the present disclosure, the laser light radiated by the laser emitting end 10 is shaped by the laser shaping device 22, so that the laser light radiated by the laser emitting end 10 can be shaped into a point laser light.

Before the step S001, the detection method of the multi-point scanning lidar further includes step S005: transmitting the laser light emitted by the laser emitting end 10 to the light guide surface 31 of the scanning device 30 through the first end 201 of the light path transmission mechanism 20 to the second end 202 of the light path transmission mechanism 20. In addition, before the step S003, the detection method of the multi-point scanning lidar further includes step S006: the light path transmission mechanism 20 transmitting the laser light diffusely reflected by the target object 300 from the second end 202 to the first end 201.

That is to say, in the present disclosure, when at least one target object 300 is detected by the detection method of the multi-point scanning lidar, the laser light emitted by the laser emitting end 10 and the laser light received by the laser receiving end 40 are both realized by the light path transmission mechanism 20. Therefore, when the target object 300 is detected by the detection method of the multi-point scanning lidar, it can not only ensure the resolution of the multi-point scanning lidar, but also can reduce the overall volume of the multi-point scanning lidar.

It should be understood by those skilled in the art that the embodiments of the present disclosure described in the above description and shown in the drawings are only examples and do not limit the present disclosure. The objectives of the present disclosure have been achieved completely and efficiently. The function and structural principles of the present disclosure have been presented and described in the embodiments, and the implementations of the present disclosure may be varied or modified without departing from the principles.

What is claimed is:

1. A multi-point scanning lidar, comprising:

at least one laser emitting end for emitting laser light;

a scanning device, wherein the scanning device forms at least one light guide surface for transmitting laser light to at least one target object;

at least one light path transmission mechanism, wherein the light path transmission mechanism is arranged between the laser emitting end and the scanning device, wherein the scanning device is arranged on a laser light path in such a manner that the light guide surface successively transmits the laser light to different parts of the target object, and wherein the laser light path is a path on which the laser light is transmitted to the target object via the light path transmission mechanism; and a laser receiving end, wherein the laser receiving end receives and analyzes the laser light reflected by the target object;

wherein the light path transmission mechanism comprises a light splitting device, a laser shaping device having a first lens group and a second lens group, and a light guide device configured to guide the laser light to the scanning device, wherein the components are arranged in the following order along the laser light path: the light splitting device, the first lens group, the light guide device, the second lens group, and the scanning device;

wherein the scanning device is implemented as a rotatable polygon mirror, and the polygon mirror is rotatable around a connecting line between centers of an upper base surface and a lower base surface of the polygon mirror as an axis, wherein each light guide surface of the polygon mirror is rectangular, and included angles between each light guide surface and either the upper or the lower base surface of the polygon mirror are different from one another.

2. The multi-point scanning lidar according to claim 1, wherein the light splitting device is arranged on a propagation path of the laser light emitted from the laser emitting end; wherein the laser shaping device is arranged to trim the laser light transmitted by the light splitting device into point laser light.

3. The multi-point scanning lidar according to claim 1, wherein the multi-point scanning lidar comprises at least two laser emitting ends, at least two light path transmission mechanisms, and at least two laser receiving ends, and wherein two laser emitting ends, two light path transmission mechanisms and the at least two laser receiving ends are symmetrically arranged with respect to the scanning device.

4. The multi-point scanning lidar according to claim 1, wherein the polygon mirror is a rotatable hexagonal mirror.

5. The multi-point scanning lidar according to claim 1, wherein the first lens group has at least one first lens and a wave plate, and the second lens group has at least one second lens, wherein the components are arranged in the following order along the laser light path: the light splitting device, the first lens, the wave plate, the light guide device, the second lens, and the scanning device.

6. The multi-point scanning lidar according to claim 1, wherein the light guide device is disposed between the first lens group and the second lens group, such that the two lens groups and the light guide device form a triangular arrangement.

7. A multi-point scanning lidar, comprising:

at least one laser emitting end for emitting laser light;

a scanning device, wherein the scanning device forms at least one light guide surface for transmitting laser light to at least one target object;

at least one light path transmission mechanism, wherein the light path transmission mechanism is arranged between the laser emitting end and the scanning device, wherein the scanning device is arranged on a laser light path in such a manner that the light guide surface successively transmits the laser light to different parts of the target object, and wherein the laser light path is a path on which the laser light is transmitted to the target object via the light path transmission mechanism; and a laser receiving end, wherein the laser receiving end receives and analyzes the laser light reflected by the target object;

wherein the light path transmission mechanism comprises a light splitting device, a laser shaping device having a first lens group and a second lens group, and a light guide device configured to guide the laser light to the scanning device, wherein the components are arranged in the following order along the laser light path: the light splitting device, the first lens group, the light guide device, the second lens group, and the scanning device;

wherein the scanning device is implemented as a micro-electro-mechanical systems (MEMS) device.

8. The multi-point scanning lidar according to claim 7, wherein the scanning device is implemented as a symmetrical two-dimensional MEMS device.

9. The multi-point scanning lidar according to claim 7, wherein the multi-point scanning lidar comprises at least two laser emitting ends, at least two light path transmission mechanisms, and at least two laser receiving ends, and wherein two laser emitting ends, two light path transmission mechanisms and the at least two laser receiving ends are symmetrically arranged with respect to the scanning device.

10. The multi-point scanning lidar according to claim 7, wherein the first lens group has at least one first lens and a wave plate, and the second lens group has at least one second lens, wherein the components are arranged in the following order along the laser light path: the light splitting device, the first lens, the wave plate, the light guide device, the second lens, and the scanning device.

11. The multi-point scanning lidar according to claim 7, wherein the light guide device is disposed between the first lens group and the second lens group, such that the two lens groups and the light guide device form a triangular arrangement.

12. The detection method according to claim 7, wherein the laser shaping device is arranged to trim the laser light transmitted by the light splitting device into point laser light.

13. A detection method of a multi-point scanning lidar, comprising steps of:

S001: transmitting detection laser light radiated via at least one laser emitting end to at least one light guide surface of a scanning device;

S002: transmitting the laser light to different parts of a target object in such a manner that an angle between the light guide surface of the scanning device and the laser light emitted from the laser emitting end is variable, wherein the step S002 further comprises:

providing a light path transmission mechanism, arranged between the laser emitting end and the scanning device, wherein the scanning device is arranged on a laser light path in such a manner that the light guide surface successively transmits the laser light to different parts of the target object, and wherein the laser light path is a path on which the laser light is transmitted to the target object via the light path transmission mechanism;

wherein the light path transmission mechanism comprises a light splitting device, a laser shaping device having a first lens group and a second lens group, and a light guide device configured to guide the laser light to the scanning device, wherein the components are arranged in the following order along the laser light path: the light splitting device, the first lens group, the light guide device, the second lens group, and the scanning device; and S003: receiving and analyzing the laser light diffusely reflected by the target object.

14. The detection method according to claim 13, wherein before the step S001, the detection method of the multi-point scanning lidar further comprises a step of:

S004: trimming the detection laser light radiated by the laser emitting end into point laser light.

15. The detection method according to claim 14, wherein before the step S001, the detection method of the multi-point scanning lidar further comprises step S005: transmitting the laser light emitted by the laser emitting end to the light guide surface of the scanning device through a first end of the light path transmission mechanism to a second end of the light path transmission mechanism, and wherein before the step S003, the detection method of the multi-point scanning lidar further comprises step S006: the light path transmission mechanism transmitting the laser light diffusely reflected by the target object from the second end to the first end of the light path transmission mechanism.

16. The detection method according to claim 13, wherein the first lens group has at least one first lens and a wave plate, and the second lens group has at least one second lens, wherein the components are arranged in the following order along the laser light path: the light splitting device, the first lens, the wave plate, the light guide device, the second lens, and the scanning device.

17. The detection method according to claim 13, wherein the scanning device is implemented as:

(1) a rotatable polygon mirror, and the polygon mirror is rotatable around a connecting line between centers of an upper base surface and a lower base surface of the polygon mirror as an axis, wherein each light guide surface of the polygon mirror is rectangular, and included angles between each light guide surface and either the upper or the lower base surface of the polygon mirror are different from one another; or (2) a micro-electro-mechanical systems (MEMS) device.

* * * * *